United States Patent [19]
Thompson et al.

[11] 3,850,028
[45] Nov. 26, 1974

[54] METHOD FOR ULTRASONIC INSPECTION

[75] Inventors: Robert B. Thompson; George A. Alers, both of Thousand Oaks; Marion A. Tennison, Camarillo, all of Calif.

[73] Assignee: Rockwell International Corporation, El Segundo, Calif.

[22] Filed: Nov. 16, 1972

[21] Appl. No.: 307,284

[52] U.S. Cl............ 73/71.5 US, 73/67.5 R, 324/40
[51] Int. Cl. ........................................... G01n 29/04
[58] Field of Search.............. 73/67.5 R, 67.6, 67.7, 73/67.8 S, 67.8 R, 67.9, 71.5 U; 324/40; 340/15

[56] References Cited
UNITED STATES PATENTS
3,460,063   8/1969   Houck et al. ......................... 340/15
3,583,213   6/1971   Houck et al. ..................... 73/67.5 R

FOREIGN PATENTS OR APPLICATIONS
248,319   7/1969   U.S.S.R............................ 73/67.8 R

OTHER PUBLICATIONS
F. W. Voltmer et al., Magnetostrictive Generation of Surface Elastic Waves, Applied Physics Letters, Sept. 1, 1969, Vol. 15, No. 5, p. 153, 154.
K. O. Legg et al., Flaw Detection in Metals Using Electromagnetic Sound Generation, J. Phys. D. Appl. Phys(GB) Vol. 3, No. 10, Oct. 1970, L61,62,

*Primary Examiner*—Richard C. Queisser
*Assistant Examiner*—John P. Beauchamp
*Attorney, Agent, or Firm*—L. Lee Humphries; Robert M. Sperry

[57] ABSTRACT

An ultrasonic transducer is disclosed having an alternating current conductor located in the field of a permanent magnet with said conductor defining a serpentine path lying parallel to the surface of a test object to induce eddy currents in the test object flowing in directions transverse to the field of the permanent magnet. Two such transducers are provided and are employed as a transmitter-receiver pair to generate and detect Rayleigh, Lamb, or other elastic waves within the object under test without requiring contact of the transducers with the object.

2 Claims, 7 Drawing Figures

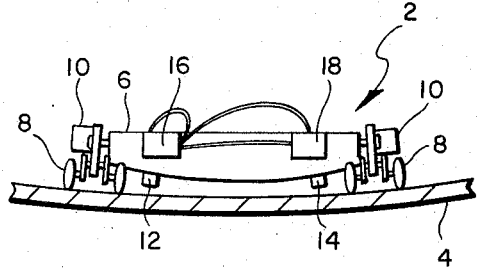
FIG. 1
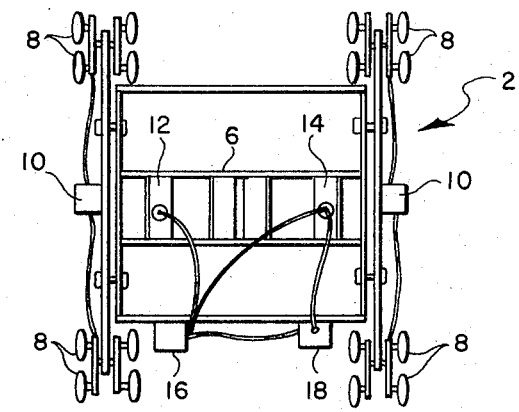
FIG. 2
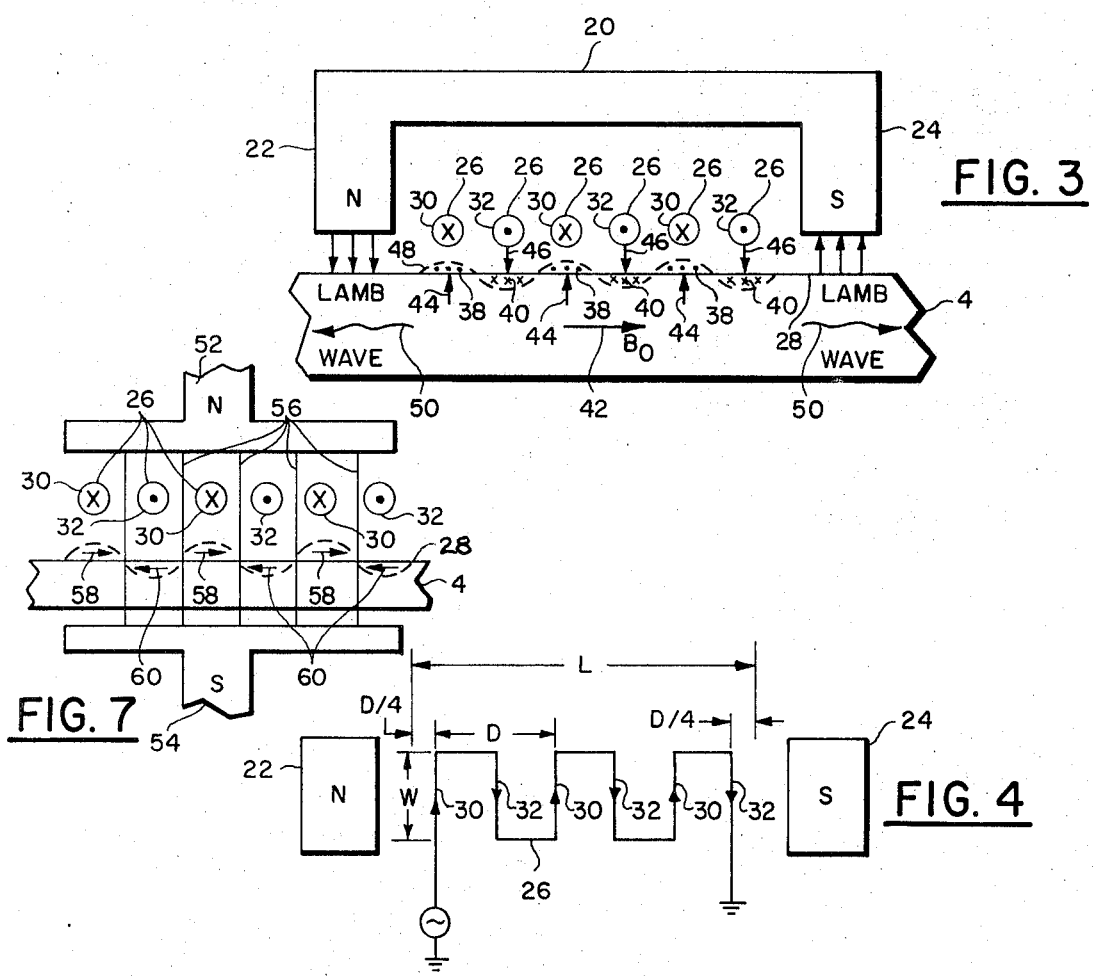

METHOD FOR ULTRASONIC INSPECTION

BACKGROUND OF THE INVENTION

1. Field of the Invention

This invention relates to ultrasonic inspection and is particularly directed to methods and apparatus for performing ultrasonic inspection without requiring contact of the transducers with the object under test.

2. Prior Art

In recent years, considerable study has been devoted to the field of non-destructive testing and numerous ultrasonic methods and apparatus have been developed for performing such testing. However, none of the prior art methods or apparatus have been entirely satisfactory. Some of the prior art methods have been difficult to perform and have yielded results which were unreliable or ambiguous. Some of the prior art methods and apparatus have required that the inspection equipment and the object under test remain stationary during testing. Still other methods and apparatus have required considerable lengths of time for setting up and adjusting the equipment prior to each inspection operation. Moreover, virtually all previous ultrasonic apparatus has required that intimate contact and mechanical bonding be maintained between the transducers and the object under test. Consequently, in testing large objects, such as pipelines, it has been customary to perform stationary "spot" tests at selected intervals along the length of the object. Unfortunately, this requires that the pipeline be out of use for considerable periods of time, which is extremely expensive for the operator.

BRIEF SUMMARY AND OBJECTS OF INVENTION

These disadvantages of the prior art are overcome with the present invention and a method is provided which permit accurate and reliable ultrasonic testing to be performed without requiring contact of the transducers with the object under test and which can tolerate quite rapid relative movement between the transducers and the test object. Consequently, the present invention makes it possible to perform substantially continuous inspection of pipelines and the like with little, if any, cessation of operation of the pipeline.

The advantages of the present invention are preferably attained by providing a pair of ultrasonic transducers, each comprising an alternating current conductor located in the field of a permanent magnet with said conductor defining a serpentine path parallel to the surface of the test object to induce eddy currents in the test object flowing in directions transverse to the field of the permanent magnet and employing said transducers as a transmitter-receiver pair to generate and detect Rayleigh, Lamb, or other elastic waves within the object under test without requiring contact of the transducers with the test object. In annular objects, such as pipelines, the Lamb waves are caused to travel circumferentially about the test object, so as to provide substantially instantaneous data at each given point as the transducers traverse through the pipeline.

Accordingly, it is an object of the present invention to provide improved methods for non-destructive testing.

Another object of the present invention is to provide improved methods for ultrasonic inspection.

A further object of the present invention is to provide method for ultrasonic inspection which does not require contact of the transducers with the test object.

An additional object of the present invention is to provide methods for ultrasonic inspection which permit quite rapid relative movement between the transducers and the test object.

A specific object of the present invention is to provide a novel technique for ultrasonic inspection comprising providing a pair of ultrasonic transducers, each having an alternating current conductor located in the field of a permanent magnet with said conductor defining a serpentine path parallel to the surface of the test object to induce eddy currents in the test object flowing in directions transverse to the field of the permanent magnet and employing said transducers as a transmitter-receiver pair to generate and detect elastic waves within the object under test without requiring contact of the transducers with the object and, in annular test objects, causing the elastic waves to travel circumferentially about the test object to provide substantially instantaneous data at each given point as the transducers traverse through the annular test object.

These and other objects and features of the present invention will be apparent from the following detailed description, taken with reference to the accompanying drawing.

BRIEF DESCRIPTION OF DRAWING

FIG. 1 is a side elevation partly in section of an ultrasonic inspection device embodying the present invention located within an annular test object;

FIG. 2 is a plan view of the inspection device of FIG. 1;

FIG. 3 is an enlarged diagrammatic sectional view of a transducer for use in the inspection device of FIG. 1;

FIG. 4 is a diagrammatic representation, showing the arrangement of the alternating current conductor of the transducer of FIG. 2;

FIG. 7 illustrates an alternative form of the inspection device of FIG. 1.

DETAILED DESCRIPTION OF THE INVENTION

Figure 5:
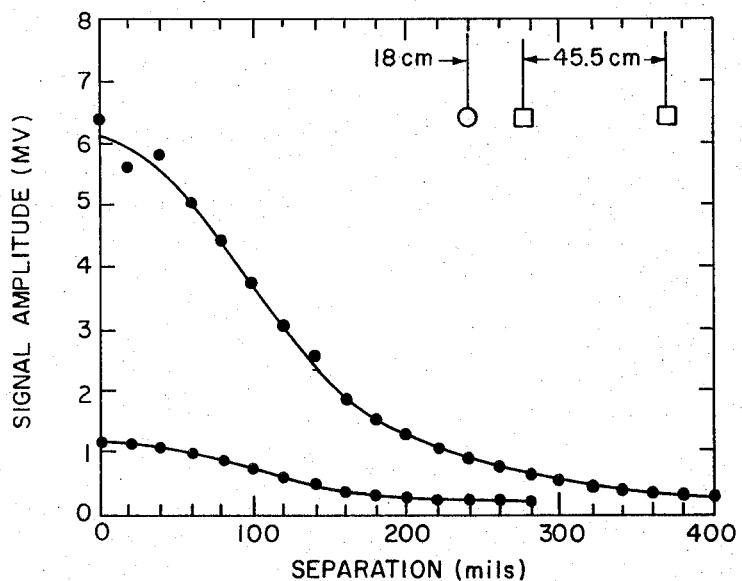
FIG. 5 is a graph showing variations of the signal from the transducer of FIG. 3 as a function of the separation between the transducer and the test object.

In that form of the present invention chosen for purposes of illustration, FIGS. 1 and 2 show an ultrasonic inspection device, indicated generally at 2, located within an annular test object 4, such as a pipe. As shown, the inspection device 2 comprises a carriage 6 mounted on wheels 8 which are driven by a suitable motor 10 mounted on the carriage 6 to cause the inspection device 2 to travel along the pipe 4. A pair of ultrasonic transducers 12 and 14 are mounted in side-by-side relation on the carriage 6 and are positioned in proximity with, but spaced from, the test object 4. The transducer 12 serves as a signal transmitter, while transducer 14 serves as a receiver. Finally, a suitable power supply 16 is mounted on the carriage 6 to energize the transducers 12 and 14 and a recorder 18 is mounted on the carriage 6 to record signals detected by the receiver transducer 14.

The transducers 12 and 14 are preferably substantially identical and, as seen in FIGS. 3 and 4, each comprises a horseshoe-type permanent magnet 20 having poles 22 and 24, and an alternating current conductor 26 which is disposed in a serpentine path between the poles 22 and 24 of the permanent magnet 20 and lies in a plane parallel to the surface 28 of the test object 4.

With this arrangement of the conductor 26, it will be seen that, at any given moment, the current will be flowing in opposite directions through the adjacent parallel portions 30 and 32 of the conductor 26, as indicated by dots and crosses on the portions 30 and 32 of conductor 26 in FIG. 3. The current through the respective parallel portions 30 and 32 will cause oppositely directed eddy currents, represented by dots 38 and crosses 40, to be induced near the surface 28 of the test object 4. Since the induced eddy currents 38 and 40 flow transversely through the magnetic field 42 of the permanent magnet 20, they will be subjected to transversely acting Lorentz forces, as indicated by arrows 44 and 46, causing Lamb waves, indicated by dashed line 48, which travel outwardly from the transducer, as indicated by arrows 50. It has been found that when the coil period, represented by dimension D, and the frequency f of the alternating current through conductor 26 are made such that their product Df equals the phase velocity of the desired Lamb wave mode, maximum excitation of this mode occurs in the test object 4.

When the inspection device 2 is to be employed for inspecting an elongated, annular test object 4, such as a pipeline, the transducers 12 and 14 are mounted on the carriage 6 with the wire segments 30 and 32 extending parallel to the axis of the pipe. In this way, the Lamb waves generated by the transmitting transducer 12 will travel circumferentially around the test object 4 to reach the receiving transducer 14. Since the Lamb waves are propagated at acoustic velocities, the time required for the waves to travel about the circumference of pipes of any finite size will be substantially instantaneous. Consequently, the carriage 6 can be made to travel through the pipe at quite rapid speeds without interfering with the reception of the Lamb waves by the receiver transducer 14.

Figure 6:
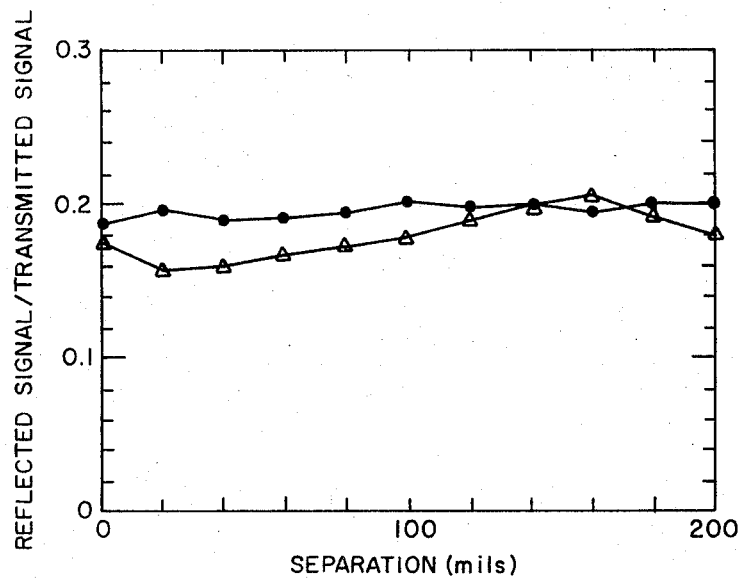
FIG. 6 is a graph showing the ratio of the magnitude of the signal reflected from a defect in a plate to that of the directly transmitted signal as the separation between either the transmitter or the receiver and the test is varied with the inspection device of FIG. 1.

As indicated above, the transducers 12 and 14 are mounted in proximity with, but spaced from, the test object 4. This is of major importance since such separation substantially eliminates frictional wear of the transducers 12 and 14 and permits measurements to be made even where the surface of the test object is rough. To test this capability, test measurements were made wherein the receiver transducer 14 was maintained at a constant separation (near zero) from the test object 4, while the separation of the transmitting transducer 12 was varied. For this experiment, the test object was a flat steel plate ⅜ inch thick, having lateral dimensions of 6 feet by 3 feet and having a flat-bottomed 1-inch diameter hole drilled ¼ inch deep on the side opposite from the transducers 12 and 14, as a simulated defect. The transmitting transducer 12 was spaced 45.5 centimeters from the receiving transducer 14. The two were positioned colinearly with the defect, and the spacing between the receiving transducer 14 and the defect was 18 cm. FIG. 5 is a graph showing the variation in the directly transmitted and reflected signals detected by the receiver transducer 14 as the separation of the transmitting transducer 12 was varied. As shown, when the transmitting transducer 12 was separated from the test object by as much as 0.1 inch, the magnitudes of the signals received by the receiving transducer 14 were still approximately ½ of their magnitude when the transmitting transducer was in contact with the test object. Moreover, both the transmitted and reflected signals were detectable at several times this spacing. In addition, it was found that the ratio of the magnitudes of these signals remained substantially constant as the separation of the transmitting transducer 12 was varied and similar results were obtained when the transmitting transducer 12 was maintained in contact with the test object while the separation of the receiving transducer 14 was varied, as illustrated in FIG. 6. Thus, it appears that the signal ratio is an absolute signature of the defect and is substantially independent of the spacing of the transducers 12 and 14 from the test object. Hence, it appears that the inspection device 2 is capable of making in-place pipeline inspections and can be used in many other applications.

FIG. 7 illustrates an alternative form of the present invention wherein a pair of permanent magnets 52 and 54 are positioned on opposite sides of the test object 4 to define a static magnetic field therebetween, as indicated by solid lines 56. The alternating current conductor 26 is identical to that of FIGS. 3 and 4, defining a serpentine path parallel to the surface 28 of the test object 4 and having parallel segments 30 and 32 with the current flowing through each of the parallel segments 30 and 32, at any given moment, in a direction opposite to that of the current flowing through each adjacent segment, as indicated by the crosses on segments 30 and dots on segments 32, and transverse to the static magnetic field 56. This produces elastic waves within the test object 4 in a manner similar to that described above, with respect to FIGS. 3 and 4, but having the driving Lorentz forces applied in the plane of the surface 28, as indicated by arrows 58 and 60, rather than perpendicular thereto.

The above describes the excitation of elastic waves by Lorentz coupling. In magnetic materials, an additional coupling mechanism arising from magnetostrictive effects may occur. The described transducers will couple to elastic waves through both effects and these mechanisms are within the contemplation of the present invention. Obviously, numerous other variations and modifications may be made without departing from the present invention. Accordingly, it should be clearly understood that the form of the present invention described above and shown in the accompanying drawing is illustrative only and is not intended to limit the scope of the present invention.

What is claimed is;

1. The method of generating elastic surface waves in a test object formed of electrically conductive material, said method comprising the steps of:
applying a static magnetic field to said test object, and positioning an alternating current conductor in the field along a serpentine path lying parallel to the surface of said test object and oriented to induce eddy currents in said test object flowing in directions transverse to said static magnetic field when an alternating current source is connected to said conductor, said serpentine path including a plurality of adjacent parallel portions extending transversely across said magnetic field such that the direction of current flow through each of said parallel portions at any given time is opposite to the direction of current flow through each adjacent one of said parallel portions.

2. The method of claim 1 wherein the: alternating current to said conductor is of a frequency such that the product of the frequency times the coil period of said conductor is equal to the phase velocity of the elastic wave mode which is to be induced in an object.

* * * * *